US012650810B2

(12) United States Patent
Bruguera et al.

(10) Patent No.: US 12,650,810 B2
(45) Date of Patent: Jun. 9, 2026

(54) TRIPLE ADDER

(71) Applicant: Arm Limited, Cambridge (GB)

(72) Inventors: Javier Diaz Bruguera, Cambridge (GB); David Raymond Lutz, Austin, TX (US); Thomas Elmer, Austin, TX (US); Nicholas Andrew Pfister, Austin, TX (US)

(73) Assignee: Arm Limited, Cambridge (GB)

( * ) Notice: Subject to any disclaimer, the term of this patent is extended or adjusted under 35 U.S.C. 154(b) by 1143 days.

(21) Appl. No.: 17/679,454

(22) Filed: Feb. 24, 2022

(65) Prior Publication Data

US 2023/0266942 A1 Aug. 24, 2023

(51) Int. Cl.
*G06F 7/502* (2006.01)

(52) U.S. Cl.
CPC ..................................... *G06F 7/502* (2013.01)

(58) Field of Classification Search
CPC .......... G06F 7/485; G06F 7/4876; G06F 7/50; G06F 7/501; G06F 7/502; G06F 7/504; G06F 7/506; G06F 7/507; G06F 7/508
See application file for complete search history.

(56) References Cited

U.S. PATENT DOCUMENTS

| | | | | |
|---|---|---|---|---|
| 2002/0143839 A1* | 10/2002 | Matson | ................... | G06F 7/508 |
| | | | | 708/605 |
| 2018/0081632 A1* | 3/2018 | Langhammer | ........ | G06F 7/4876 |
| 2020/0174750 A1* | 6/2020 | Langhammer | .......... | G06F 7/485 |

OTHER PUBLICATIONS

J.D. Bruguera et al., Multilevel Reverse-Carry Adder, IEEE 2000 (Year: 2000).*

* cited by examiner

*Primary Examiner* — Emily E Larocque

(74) *Attorney, Agent, or Firm* — NIXON & VANDERHYE P.C.

(57) ABSTRACT

A data processing apparatus is provided, which includes addition circuitry that performs a calculation of a sum of a first operand and a second operand. The addition circuitry produces an intermediate data prior to the calculation completing. Determination circuitry uses the intermediate data to produce the sum of the first operand and the second operand plus 1. Further determination circuitry configured to use the intermediate data to produce the sum of the first operand and the second operand plus 2.

18 Claims, 11 Drawing Sheets

| i  | 5 | 4 | 3 | 2 | 1 | 0 |
|----|---|---|---|---|---|---|
| c* |   |   |   |   |   | 1 |
| c  |   |   |   |   |   | 1 |
| a  | 0 | 1 | 1 | 1 | 1 | 1 |
| b  | 0 | 1 | 1 | 1 | 1 | 1 |
|    |   |   |   |   |   |   |
| 1  | 0 | 0 | 0 | 0 | 0 | 0 |

FIG. 4A

| i  | 5 | 4 | 3 | 2 | 1 | 0 |
|----|---|---|---|---|---|---|
| c* |   |   |   |   |   | 1 |
| c  |   |   |   |   |   | 1 |
| a  | 0 | 1 | 1 | 1 | 1 | 1 |
| b  | 1 | 1 | 1 | 1 | 1 | 1 |
|    |   |   |   |   |   |   |
| 1  | 1 | 0 | 0 | 0 | 0 | 0 |

FIG. 4B

TRIPLE ADDER

TECHNICAL FIELD

The present disclosure relates to data processing.

DESCRIPTION

In computer systems, it is often necessary to determine the sum of two operands (A+B), as well as the sum plus one (A+B+1), and the sum plus two (A+B+2). For instance, these three values might be used in rounding, which is necessary due to how computer systems store floating point numbers. These three values could be determined using three adder circuits operating in parallel. But this uses a great deal of circuit space and therefore power. These three values could also be determined using one or more (dual) adder circuits in series. However, this would be very slow. It would be desirable to be able to produce the three values in a small number of clock cycles, while keeping the circuit size small in order to reduce power consumption.

SUMMARY

Viewed from a first example configuration, there is provided a data processing apparatus comprising: addition circuitry configured to perform a calculation of a sum of a first operand and a second operand, wherein the addition circuitry produces an intermediate data prior to the calculation completing; determination circuitry configured to use the intermediate data to produce the sum of the first operand and the second operand plus 1; and further determination circuitry configured to use the intermediate data to produce the sum of the first operand and the second operand plus 2.

Viewed from a second example configuration, there is provided a method of data processing comprising: performing a calculation of a sum of a first operand and a second operand, wherein the addition circuitry produces an intermediate data prior to the calculation completing; using the intermediate data to produce the sum of the first operand and the second operand plus 1; and using the intermediate data to produce the sum of the first operand and the second operand plus 2, wherein each of the sum of a first operand and a second operand, the sum of the first operand and the second operand plus 1, and the sum of the first operand and the second operand plus 2 is produced within a same clock cycle.

Viewed from a third example configuration, there is provided a non-transitory computer-readable medium to store computer-readable code for fabrication of a data processing apparatus comprising: addition circuitry configured to perform a calculation of a sum of a first operand and a second operand, wherein the addition circuitry produces an intermediate data prior to the calculation completing; determination circuitry configured to use the intermediate data to produce the sum of the first operand and the second operand plus 1; and further determination circuitry configured to use the intermediate data to produce the sum of the first operand and the second operand plus 2.

BRIEF DESCRIPTION OF THE DRAWINGS

The present invention will be described further, by way of example only, with reference to embodiments thereof as illustrated in the accompanying drawings, in which:

FIGS. 4A and 4B show an example addition of a sum+2;

DESCRIPTION OF EXAMPLE EMBODIMENTS

Figure 1:
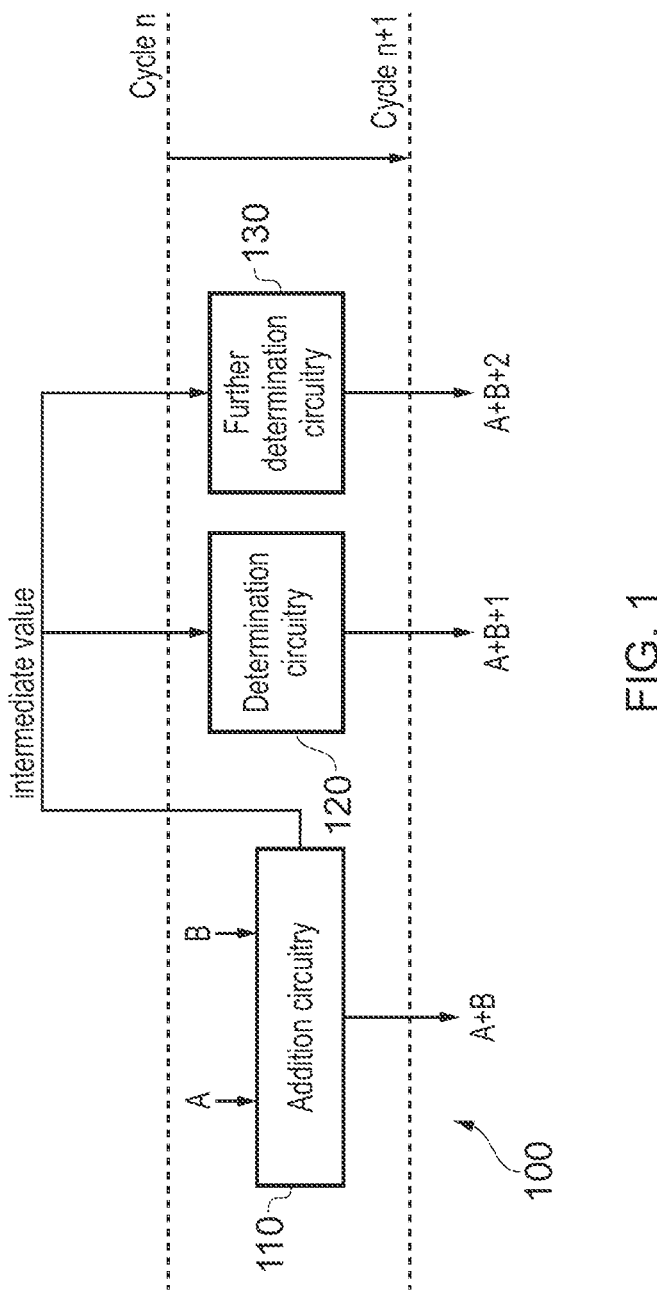
FIG. 1 schematically illustrates a data processing apparatus in accordance with some examples.

Before discussing the embodiments with reference to the accompanying figures, the following description of embodiments is provided.

In accordance with one example configuration there is provided a data processing apparatus comprising: addition circuitry configured to perform a calculation of a sum of a first operand and a second operand, wherein the addition circuitry produces an intermediate data prior to the calculation completing; determination circuitry configured to use the intermediate data to produce the sum of the first operand and the second operand plus 1; and further determination circuitry configured to use the intermediate data to produce the sum of the first operand and the second operand plus 2

In these examples, a sum of the two operands (A+B) is produced. During this computation, an intermediate data is produced. The intermediate data is then used to produce both the sum plus one (A+B+1) and the sum plus two (A+B+2). Since the intermediate data is used rather than relying on the completed calculation of A+B, the calculation of the three additions is more efficient than waiting for one addition to be calculated after another. Indeed, this is further improved by the fact that both the calculation of the sum plus one and the calculation of the sum plus two use the same intermediate data produced by the addition circuitry. Furthermore, since an intermediate data is used, with the intermediate data being produced during the calculation of the sum A+B, a reduction in circuit size is achieved as compared to a situation where three independent adders are provided.

In some examples, the sum of a first operand and the second operand, the sum of the first operand and the second operand plus 1, and the sum of the first operand and the second operand plus 2, are all produced within a same clock cycle. All three values are therefore produced simultaneously (from the perspective of the circuitry). This is particularly efficient where all three values are provided for the purposes of rounding, since it does not cause part of the data processing apparatus to stall while some of the three values are calculated.

In some examples, the sum of the first operand and the second operand, the sum of the first operand and the second operand plus 1, and the sum of the first operand and the second operand plus 2 are produced using no more than one adder. The data processing apparatus is therefore space efficient due to the avoidance of multiple adder circuits being provided. Adder circuits are typically space intensive and therefore not only require space on a circuit to be implemented, but also increase the overall power consumption, even when not actively in use. Here, an adder is considered to be a device that outputs, as a single word, the result of performing an addition between two parameters. This therefore differs from, for instance, half adders that output a result of adding two parameters as a pair of words, e.g. as a (sum, carry) tuple. An adder may be made up of two half adders—one to produce the (sum, carry) tuple and another to add the (sum, carry) tuple to produce a single word. Consequently, the phrase "no more than one adder" allows for a half adder that passes results to an adder, but not for an adder together with a first adder and a second adder made up from two half adders. Similarly, the phrase "no more than one adder" allows for an adder and a collection of half adders provided those half adders do not cooperate to act as a further adder.

Although there are a number of ways in which the three values can be calculated, in some examples, the intermediate data comprises a most significant n−1 bits of the sum of the first operand and the second operand plus 2, wherein n is equal to a number of bits in the sum of the first operand and the second operand. That is to say that the sum of the first operand and the second operand is n bits in length (excluding any carry bit leftover at the end of the addition). The intermediate data that is produced by the addition circuitry and that is used to produce the sum of the first operand and the second operand plus 1 and the sum of the first operand and the second operand plus 2 comprises the most significant n−1 of those bits.

In some examples, the addition circuitry is configured to determine the most significant n−1 bits of the sum of the first operand and the second operand plus 2 without calculating the least significant bit of the sum of the first operand and the second operand plus 2.

In some examples, the addition circuitry comprises a dual adder configured to provide a most significant n−1 bits of the sum of the first operand and the second operand and the most significant n−1 bits of the sum of the first operand and the second operand plus 2. The dual adder can provide the two values simultaneously. In some examples, both of these two values are calculated without calculating the corresponding least significant bit of the two sums. In addition, the dual adder might also calculate a carry bit that is leftover at the end of the addition.

In some examples, the addition circuitry is configured to provide the intermediate data to the determination circuitry and the further determination circuitry before a least significant bit of the sum of the first operand and the second operand plus 1 is determined. The n−1 most significant bits of the sum of the first operand and the second operand plus 1 are therefore determined separately to the least significant bit of the sum of the first operand and the second operand.

In some examples, the data processing apparatus comprises: one or more half adders configured to perform a half-add operation on the first operand and the second operand to produce n bits of an s-value and n bits of a c-value, wherein n−1 most significant bits of the s-value and n−1 least significant bits of the c-value are provided to the addition circuitry to provide the most significant n−1 bits of the sum of the first operand and the second operand plus 2 (again, excluding any leftover carry bit produced by the dual adder). In a half-add operation, two values are added together in order to produce a set of carry bits and a set of sum bits. However, no carry input is provided within the half adder circuitry. That is, for each bit position, an output sum bit (s) and an output carry bit (c) are produced from a first input bit (a) and a second input bit (b). This differs from an adder in which, for each bit position, a result bit (x) and a carry-out bit ($c_{out}$) are produced from a first input bit (a), a second input bit (b) and a carry-in bit ($c_{in}$).

In some examples, the addition circuitry is configured to combine the intermediate data with a least significant bit of the s-value to produce the sum of the first operand and the second operand. In these examples, the intermediate data might also be combined with an output carry bit that is also output from the addition circuitry in order to produce the sum of the first operand and the second operand.

In some examples, the further determination circuitry is configured to combine the intermediate data with a least significant bit of the s-value to produce the sum of the first operand and the second operand plus 2. In these examples, the intermediate data might also be combined with an output carry bit that is also output from the addition circuitry, in order to produce the sum of the first operand and the second operand plus 2. This may differ from any carry bit used by the addition circuitry to produce the sum of the first operand and the second operand In some examples, the determination circuitry is configured to combine the intermediate data with an inversion of the least significant bit of the s-value to produce the sum of the first operand and the second operand plus 1. In these examples, the intermediate data might also be combined with an output carry bit that is also output from the addition circuitry, in order to produce the sum of the first operand and the second operand plus 1. This may differ from the carry bit that is used by the further determination circuitry to produce the sum of the first operand and the second operand plus 2.

In some examples, the addition circuitry comprises determination circuitry to determine, for each pair of (first operand, second operand) bits: a generate bit to indicate whether every preceding pair of (first operand, second operand) bits generates an outgoing carry, and a propagate bit to indicate whether that pair of (first operand, second operand) bits propagates an incoming carry; and the intermediate data comprises the generate bit for the each pair of (first operand, second operand) bits. Consider an n-bit operand A[n−1:0] and an n-bit operand B[n−1:0]. Each pair of bits at a position i (0<i<n−1) are combined as part of the addition operation. For each pair of bits, that pair of bits will either generate an outgoing carry or not. This is dependent on whether both of $a_i$ and $b_i$ is 1. If so, then the bits at position i generate a carry, otherwise not. This carry-generate bit at position i is noted $g_i$. Meanwhile, G defines whether a carry into position i is generated by the preceding bits (0 to i−1). The propagate bit $p_i$ for a position i is used to indicate whether the pair of bits at position i will propagate an incoming carry or not. This will be the case if exactly one of $a_i$ and $b_i$ is 1. If both $a_i$ and $b_i$ are 1 or 0 then any incoming carry is 'absorbed' into the sum for the position i.

In some examples, the addition circuitry is configured to calculate a consume bit to indicate whether any preceding pair of (first operand, second operand) bits consumes the incoming carry; and the further determination circuitry is configured to calculate a further consume bit to indicate whether any preceding pair of (first operand, second operand) bits consumes the incoming carry or a further incoming carry. Ordinarily, a carry bit represents the 'overflow' of one bit position and that, therefore, this must be compensated for by an increase in the next bit position. In these examples, the further incoming carry can represent a double overflow, not from the preceding bit position bit from the bit position prior to that. For instance, if two bits are to be added to a bit position h, then this would normally generate a carry for the bit position h+1. However, if four bits are to be added to a bit position h, then this would generate a further carry for the bit position h+2 (as opposed to create a carry for the bit position h+1). In these examples, the consume bit (also known as a carry-kill bit) indicates whether the preceding pairs of bits consumes incoming carries or incoming further carries.

In some examples, the further determination circuitry is configured to calculate the further consume bit using a further generate bit to indicate whether every preceding pair of (first operand, second operand) bits generates an outgoing carry and whether a current pair of (first operand, second operand) bits does not generate an outgoing carry.

In some examples, the further determination circuitry is configured to calculate the further consume bit using a first prefix tree and to calculate the further generate bit using a second prefix tree, different to the first prefix tree. A prefix tree is made up of a series of logical gates in a tree-like structure where the outputs of some gates are provided as inputs to other gates. In these examples, the prefix trees are arranged so as to indicate, for every bit, whether a property holds for that bit and all preceding bits. For instance, consider the property "this bit and all preceding bits are 0". To calculate whether this property holds for one bit requires performing an AND operation for each preceding bit. By setting out the AND gates in a tree structure, it is possible to determine whether "this bit and all preceding bits are 0" for every bit. In these examples, a pair of prefix trees are provided, with the two prefix trees being distinct. The first prefix tree is used to determine the further consume bit. The second prefix tree is used to calculate the further generate bit. This, however, can use a reasonable amount of space (depending on the maximum size of the operands) since two AND trees are required.

As an alternative to the above examples, the further determination circuitry is configured to calculate the further consume bit and to calculate the further generate bit using a single prefix tree. Each node in the single prefix tree is more complicated since it is responsible for providing two different values. The prefix tree is therefore slower to operate, but may still operate more quickly than two separate prefix trees. In addition, by providing a single prefix tree, the circuit area that is required might be smaller.

In some examples, the addition circuitry comprises a dual adder. A dual adder is capable of performing two addition operations at once.

Particular embodiments will now be described with reference to the figures.

FIG. 1 schematically illustrates a data processing apparatus 100 in accordance with some embodiments. The data processing apparatus 100 includes addition circuitry 110 that receives two operates—A and B, each of n bits. The addition circuitry is responsible for performing the sum on A and B in order to produce the result A+B. During the addition process, an intermediate value is output by the addition circuitry. This intermediate value is used by determination circuitry 120 to produce the sum A+B+1 and by further determination circuitry 130 to produce the sum A+B+2. In some embodiments, the circuitry is such that each of sums A+B, A+B+1, and A+B+2 are produced within a same clock cycle. The nature of the intermediate value differs between the multiple embodiments, but it is produced before the final sum A+B is produced. That is, the determination circuitry 120 and the further determination circuitry 130 do not simply take the sum A+B and then add 1 and 2 respectively (which would, in any event, necessitate more than one clock cycle to produce all of the sums).

Before continuing it is worth giving a brief overview of the process of producing a sum of two integer operands A and B in a data processing apparatus. Here, we assume that A and B are of the same length. If this is not the case, it can be trivially achieved by padding the smaller operand so that both operands are made up of the same number of bits (which we denote by the variable n). Basic adders are concerned with several different values for each bit position i ($0 \leq i < n$):

$p_i$ is a value that indicates whether a carry-propagate occurs at bit position i. A carry-propagate means that any incoming carry (from an overflow of the previous bit position i−1) is also output. In particular, carry propagation occurs if exactly one of $A_i$ and $B_i$ is a '1'. If both bits are 0 then the carry is 'absorbed'. If both bits are '1' then a new carry is generated, but any incoming carry is absorbed (since the value of the sum at bit position I will then be 0). In other words, $p_i = A_i \oplus B_i$.

$g_i$ is a value that indicates whether a carry-generation occurs at bit position i. A carry-generate means that the bits at position i generate a carry value. This occurs if both $A_i$ and $B_i$ are a '1'. In other words $g_i = A_i \cap B_i$.

$k_i$ is a value that indicates whether a carry-kill occurs at bit position i. Some adders may not use the carry-kill or might instead consider its complement $\overline{k_i}$. In any event, a carry-kill occurs when both bits at bit position i are 0. The complement $\overline{k_i}$ therefore occurs if at least one of the bits at position i is 1. In other words, $\overline{k_i} = A_i \cup B_i$.

Each of these values can be determined independently for the bits at a position i. However, the process of performing a full add (as opposed to a half-add) requires for the possibility of a carry propagating across a number of bit positions and this requires some kind of chaining between the bit positions from least significant (0) to most significant (n). Full adders often achieve this chaining by means of a prefix tree, which can be used to determine the value $G_i$.

G is a value that indicates whether a carry into position i is generated by the preceding bits (0 to i−1). This, of course, necessitates some analysis of each of the previous bits. Theoretically, for each bit, an analysis of all previous bits is required. However, by arranging the requisite logic gates in the form of a tree, it is possible to 'iterate' through each bit, passing the result from one position j, to a next position j+1. Using G, the sum bit for each bit position can be calculated as $s_i = G_i \oplus p_i$.

Figure 2:
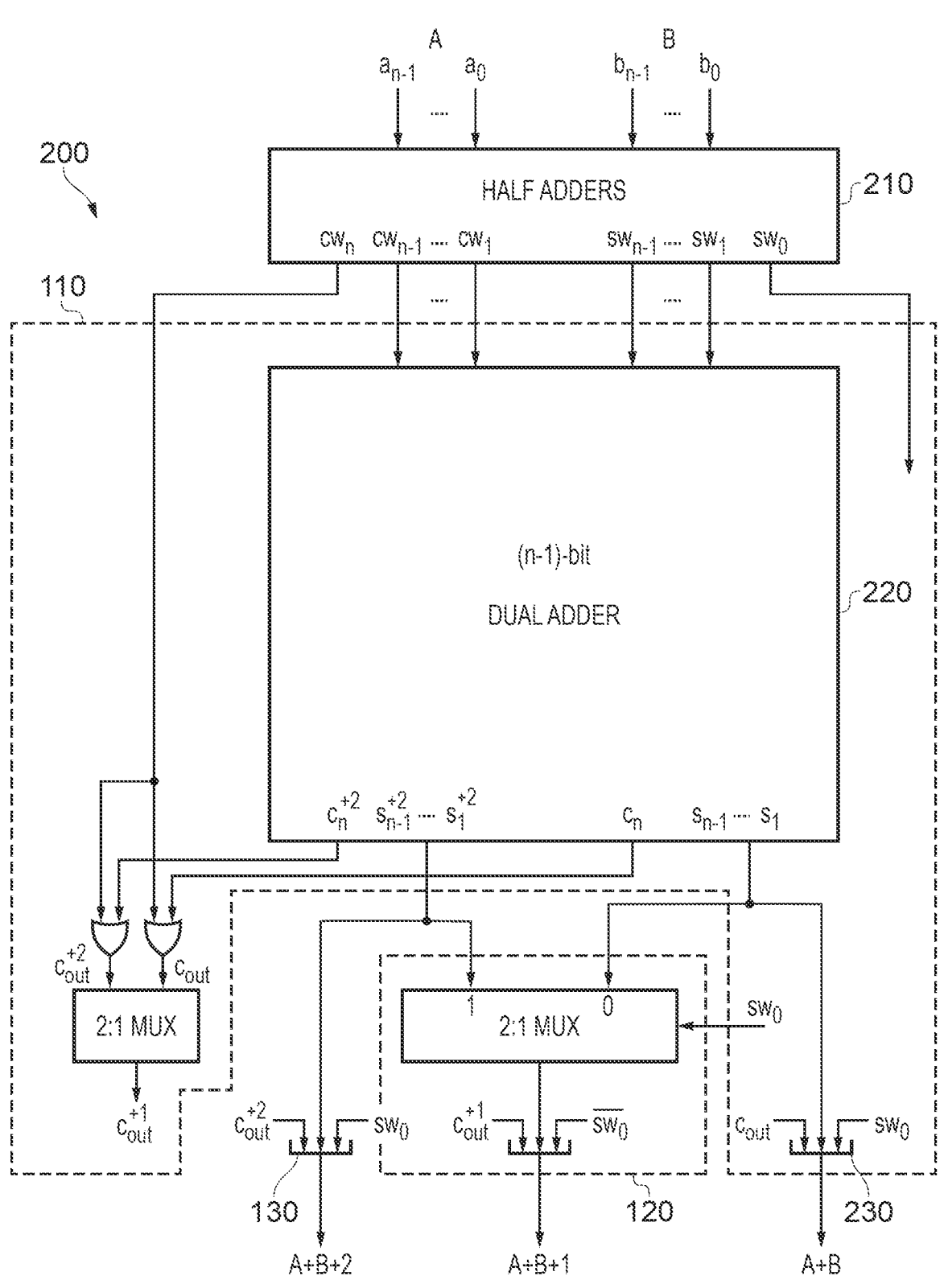
FIG. 2 illustrates a first example of a data processing apparatus that determines the sums A+B, A+B+1, A+B+2 and can do so within a single clock cycle.

FIG. 2 illustrates a first example of a data processing apparatus 200 that determines the sums A+B, A+B+1, A+B+2 and can do so within a single clock cycle. The apparatus contains a series of half adders 210. Whereas a full adder produces the result of an addition of A+B as a single word, a half adder produces the result of an addition of A+B as a pair of words made up from sum bits (S) and carry bits (C). The result is therefore in redundant representation. At each bit position i in a half adder, the result can output a sum bit (sw) and a carry bit (cw) by considering a first input bit (a) and a second input bit (b). Importantly, however, the inputs preclude a carry bit. Thus, a carry cannot propagate between bit positions. A half adder is therefore significantly faster than a full adder, because each bit position can be considered in parallel. The output result (S, C) can be converted back to non-redundant representation by means of a second half-adder (hence the name).

n−1 least significant bits of the carry value (bits $cw_{n-1}$ to $cw_1$) and n−1 most significant bits of the sum value (bits $sw_{n-1}$ to $sw_1$) are passed to a dual adder 220. Typically, a dual adder determines A+B and is also able to simultaneously determine A+B+1 by providing a carry in to the first bit position. In this case, since the least significant bit of the sum (bit $sw_0$) produced from the half adders is not provided to the dual adder 220, the carry in to the first bit position has a value of 2 rather than a value of 1. The outputs of the dual adder 220 therefore constitute n−1 bits of A+B and A+B+2 and carry bits $c_n^{+2}$ and $c_n$. The n−1 bits of A+B and A+B+2 lack the least significant bit of A+B and A+B+2 (since this was not provided from the dual adder 220) and also lack the most significant bit of A+B and A+B+2, which is instead determined from the carry bits $c_n^{+2}$ and $c_n$.

The least significant bit of the sum produced by the half adders 210 (bit $sw_0$) can be re-added at a least significant position of the pairs of n−1 bits to produce a least significant n bits of A+B and A+B+2 using first concatenation circuitry 230 and second concatenation circuitry 130 (which is an example of the claimed further determination circuitry) to calculate each of A+B and A+B+2 respectively.

The most significant bit of A+B ($c_{out}$) and of $$A + B + 2(c_{out}^{+2})$$

depends on the result of the most significant carry bit ($cw_n$) produced by the half adders. For A+B and A+B+2, the most significant bit is determined by performing a logical OR of the most significant carry bit ($cw_n$) from the half adders 210 and the carry bit from the output of the dual adder 220 for the A+B sum or A+B+2 sum as appropriate.

$$c_{out} = c_n \cup cw_n$$

$$c_{out}^{+2} = c_n^{+2} \cup cw_n$$

All of this leaves the calculation of the A+B+1 sum. This can be derived from the n−1 bits of A+B and the n−1 bits of A+B+2 produced by the dual adder 220. If the least significant bit ($sw_0$) produced by the half adders 210 is 0, then the least significant bit of A+B will also be 0. In this case, the n least significant bits of A+B+1 can be produced by taking the n−1 bits of A+B and then concatenating a least significant bit of 1 (rather than adding the bit $sw_0$=0). Alternatively, if the least significant bit ($sw_0$) produced by the half adders 210 is 1 then this cannot be done (because it may cause a 'ripple' of carries throughout the result). Instead, the n least significant bits of A+B+1 can be produced by taking the n−1 bits of A+B+2 and then concatenating a least significant bit of 0 (rather than adding the bit $sw_0$=1). In either case, therefore, the inversion of bit $sw_0$ is concatenated.

The most significant bit of $$A + B + 1(c_{out}^{+1})$$

is produced from either of the most significant bits from $$A + B(c_{out})$$

and from $$A + B + 2(c_{out}^{+2}).$$

In particular, which of these values is used depends on which set of bits (A+B or A+B+2) were used to produce A+B+1. In particular:

$$c_{out}^{+1} = \begin{cases} c_n \cup cw_n & \text{if } sw_0 = 0 \\ c_n^{+2} \cup cw_n & \text{if } sw_0 = 1 \end{cases}$$

Thus, in the above example, the intermediate data takes the form of the outputs from the n−1 bit dual adder, which is equal to n−1 bits of the sum of A+B and A+B+2.

Thus, the dual adder 220 acts to simultaneously provide n−1 bits of A+B and A+B+2. First concatenation circuitry 120 is provided to re-add the least significant bit of the sum produced by the half adders 210 to the n−1 bits of A+B and the carry bit $c_{out}$ to produce the sum A+B. Meanwhile, second concatenation circuitry 130 is provided to re-add the least significant bit of the sum produced by the half adders 210 to the n−1 most significant bits of A+B+2 and the carry bit $$c_{out}^{+2}$$

to produce the sum A+B+2. Thus, by inserting a series of half adders to operate on each bit position, it is possible to configure the dual adder 220 to produce the sums A+B and A+B+2 simultaneously.

Figure 3:
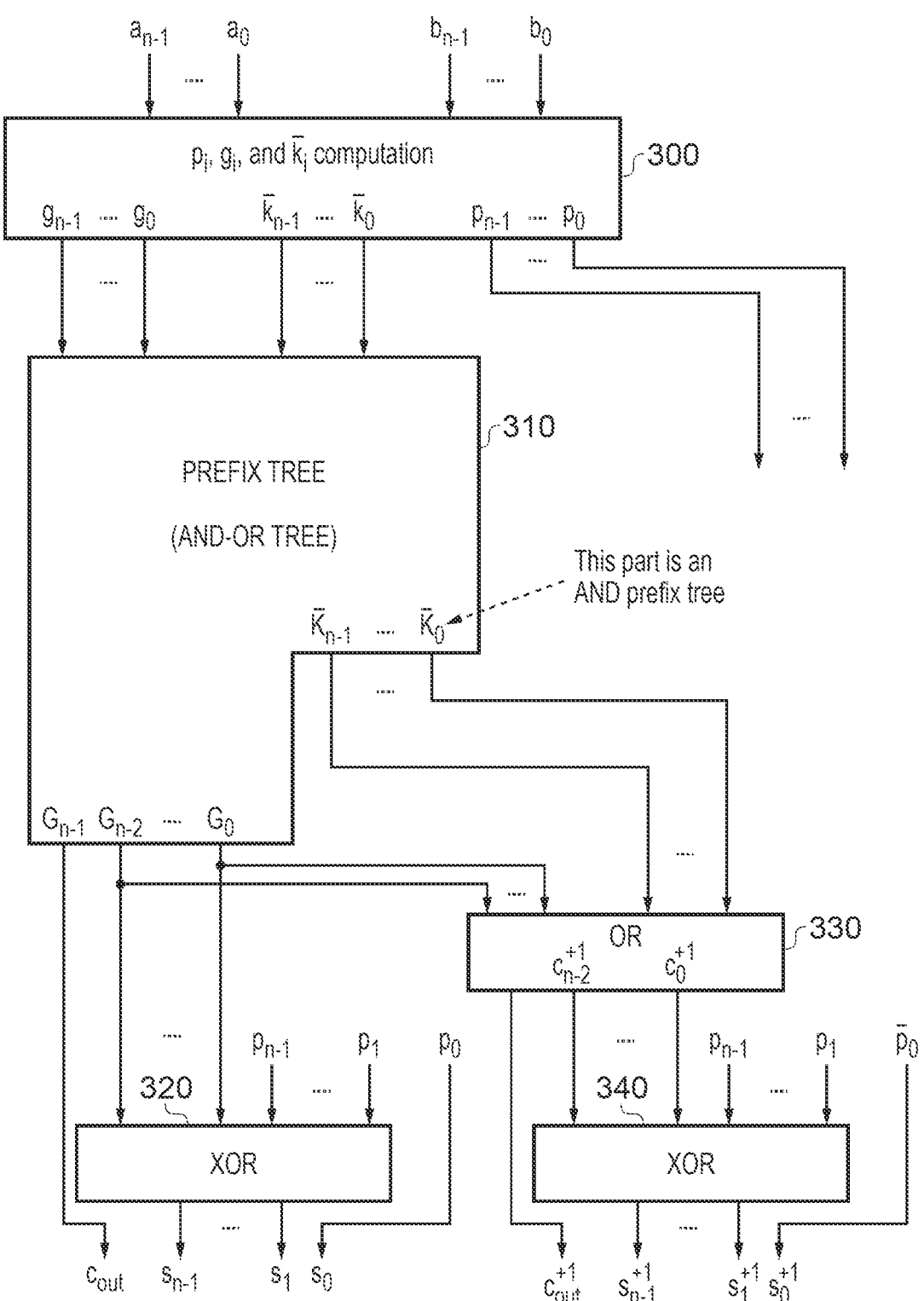
FIG. 3 shows a dual adder.

For convenience, FIG. 3 shows a dual adder that can be configured to act as the dual adder 220 shown in FIG. 2. Briefly, the dual adder contains computation circuitry for producing, for each bit position i, each of g, $\overline{K}$, and p as previously discussed. These are then provided to a prefix tree or trees to produce G as previously discussed as well as $\overline{K}_i$ $\overline{K}_i$ is a value that indicates whether a carry-kill is generated by the preceding bits (0 to i−1).

$G_i$ and $p_i$ are then provided to a series of XOR gates 320 to provide the bits corresponding to A+B. Meanwhile, $\overline{K}_i$ and $G_i$ are provided to a series of OR gates to produce modified carry bits $$c_{n-2}^{+1} \text{ and } c_0^{+1},$$

these are provided to XOR gates 340 that perform a XOR operation on the modified carry bits and $p_1$ to $p_{n-1}$. The resulting output is combined with $\overline{p}_0$ to produce the bits for A+B+1. It will be appreciated that other implementations of dual adders could also be used and the present technique is not limited to the specific example illustrated in FIG. 3. Note that unmodified dual adders in general cannot be directly used to also produce A+B+2 because the bits $a_0+b_0$ might also produce a carry.

An alternative technique to achieving the triple adder is to use a dual adder to calculate A+B and A+B+1 and then to recalculate the K (or $\overline{K}$) and G vectors necessary to produce A+B+2.

The calculation of A+B+2 can be thought of as having four inputs—A, B, 1 ($c_{in}$), and a further 1

$$(c_{in}^*).$$

In a worst-case scenario, $A_0$ and $B_0$ are both 1 meaning that bit position has a value of 4 to be added when the maximum output value is 1. In this situation, there is no carry into bit position 1, but there is a carry into bit position 2. Furthermore, bit position 1 could also produce a carry out. So the sum of bits at bit position 2 could also be 4. This 'chain' continues until a 0 bit occurs in $A_i$ or $B_i$. The sum of all further inputs can then be no more than 3.

As shown in FIGS. 4A and 4B, the 0s that occur at i=5 break the chain. In both cases, there is a carry equal to 0 at i=5 and a carry equal to 1 at i=6. In fact, in general the following rules apply:

The chain end occurs when $$G_{j-1}^* = \prod_{i=0}^{j-1} g_i = 1 \text{ and } g_j = 0$$

The j least significant bits of A+B+2 are 0
There is a carry of 0 at bit position j
There is a carry of 1 at bit position j+1
The addition of bits at position j do not produce an additional carry to bit position j+1 because the carry in to bit position j is 0 and the bits at this position are $A_jB_j=\{00, 01, 10\}$ (if the bits were $\{11\}$ then the 'chain' would be longer)

Figure 5:
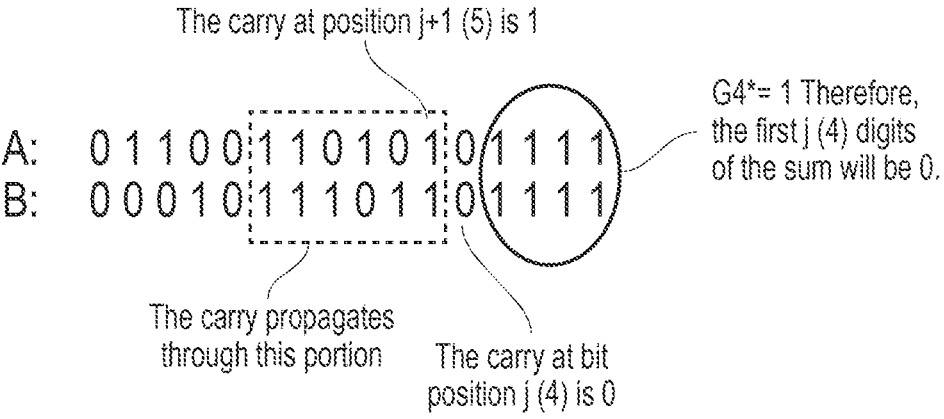
FIG. 5 illustrates the behaviour of particular bits during the operation.

An example is graphically illustrated in FIG. 5 where A (0110011010101111) and B (0001011101101111) are added together. As shown, the chain (j) of is in both A and B is four digits long. The carry at the next position is 0, and the carry into the position following that is 1 (which is caused by the end of the chain creating a double carry). This carry is then propagated through a number of places until $A_i$ and $B_i$ are both 0.

Assuming that the chain extends from bit 0 to bit j−1, the j least significant bits of A+B+2 and the carry in to bit position j can be cleared with $G^*_{n-1}$, which is defined as being 1 only at positions 0 to j−1. To obtain the other carries, including the carry in to bit position $$j + 1\left(c_{j+1}^{+2}\right),$$

the $\overline{K}_I$ vector is modified to $$\overline{K}^*\left(\text{i.e.} \prod_{i=0}^{n-1} \overline{k}_i^*\right)$$

(where k* is defined below) and then the calculation proceeds using this modified vector. In other words:

$$c_i^{+2} = G_{i-1} \cup \overline{K_{i-1}^*}$$

with $$c_0^{+2} = 0.$$

Figure 6:
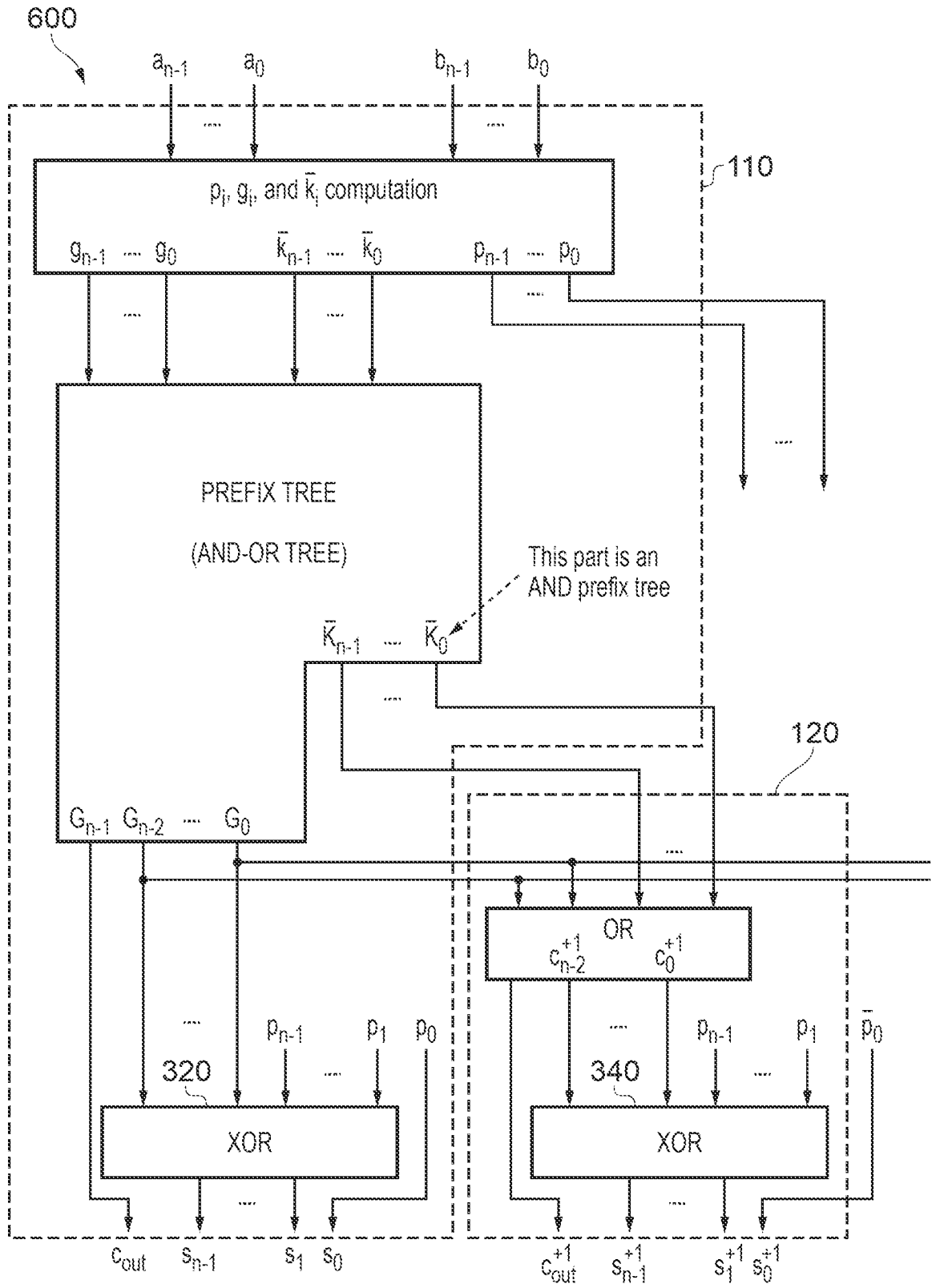
FIG. 6 illustrates a second example of a data processing apparatus.
Figure 6:
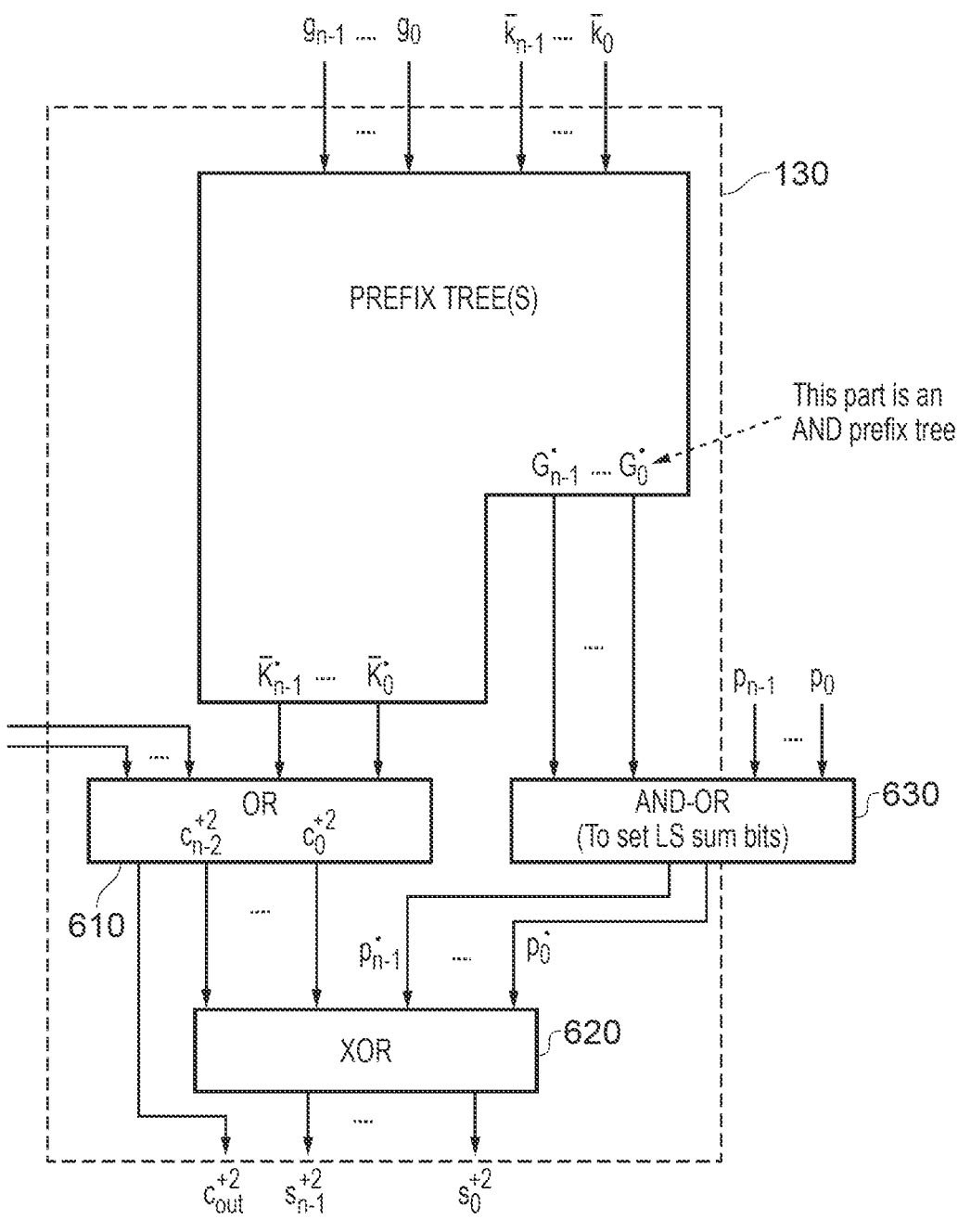

FIG. 6 illustrates an example of a triple adder 600 that makes use of a dual adder as previous discussed. In this example, the addition circuitry 110 takes the form of part of the dual adder to produce the sum A+B while the remainder of the dual adder takes the form of the determination circuitry, to produce the sum A+B+1. The remaining circuitry acts as the further determination circuitry to produce the sum A+B+2 in the manner just described. The intermediate data includes the vector G, which is produced during the calculation of the sum A+B by the adder circuitry 110 and is used in the OR gates 610 of the further determination circuitry (which are analogous to the OR gates 330 that make up the dual adder). The resulting carry values from those OR gates 610 are passed to XOR gates 620, which are analogous to the XOR gates 340 in the dual adder.

The least significant j bits of the sum are set to 0 by modifying the $p_i$ bits using the G* vector as previously described. The modified p bits ($p^*_i$) are then passed to the final XOR gates 620. In particular, the p* bits are defined as:

$$p_0^* = 0$$

$$p_i^* = p_i \overline{G_i^*} \cup G_i^* \cup k_i G_{i-1}^* \text{ for } i > 0$$

In this way:

$$p_i^* = c_i^{+2} \text{ for } 0 < i < j$$

$$p_i^* = k_i \text{ for } i = j$$

$$p_i^* = p_i \text{ for } i > j$$

Note that setting $$p_i^* = k_i$$

for i=j (where j is as previously explained) is equivalent to setting $$c_j^{+2} = 0$$

(i.e. no carry occurs).

The sum bits for A+B+2 are then obtained as:

$$s_i^{+2} = c_i^{+2} \oplus p_i^*$$

Then, since $$c_i^{+2} = G_{i-1} \cup \overline{K_{i-1}^*}$$

(where $\overline{K}^*$ is a modification of the vector $\overline{K}$)

$$s_i^{+2} = \left(G_{i-1} \cup \overline{K_{i-1}^*}\right) \oplus p_i^*$$

Which sets $$s_i^{+2} = 0 \text{ for } 0 < i < j \text{ and } s_j^{+2} = p_j$$

These calculations are performed by the AND-OR gates 630 and the previously mentioned XOR gates 620. Meanwhile, the G* vector is produced as part of a prefix tree or trees 640.

It therefore remains to be shown how the $\overline{K}^*$ vector can be produced. In practice, this is also produced using the prefix tree or trees 640. However, this can be produced using the same prefix tree as that used to produce the G* vector, or it can be carried out with two separate trees as will be discussed in the following paragraphs.

The carry into position j+1 is set to 1 (as explained above). This can be achieved by setting $$\overline{k}_j^* = 1.$$

However, since operands at bit positon j ($A_j$ and $B_j$) can take the values {00, 01, 10}, the vectors $\overline{K}^*$ and $\overline{K}$ can be different. In particular consider the example where:

A=1011 1010 1011 1111
B=0011 0001 0011 1111
  then
$\overline{K}$=0000 0000 0011 1111
$\overline{K}^*$=0000 0011 1111 1111

Here, at position j=6, (i.e. where $A_j$, =00), $$\overline{k}_j^*$$

is forced to be 1 (via the above 'rules'), whereas $\overline{k}_j$ is 0. The $$\overline{k}_i^*$$

bits can be obtained as:

$$\overline{k}_0^* = 1$$

$$\overline{k}_1^* = \overline{k}_1 \cup g_o = \overline{k}_1 \cup G_o^*$$

$$\overline{k}_2^* = \overline{k}_2 \cup g_1 g_0 = \overline{k}_2 \cup G_1^*$$

$$\overline{k}_3^* = \overline{k}_3 \cup g_2 g_1 g_0 = \overline{k}_3 \cup G_2^*$$

$$\overline{k}_4^* = \overline{k}_4 \cup g_3 g_2 g_1 g_0 = \overline{k}_4 \cup G_3^*$$

or more generally:

$$\overline{k}_x^* = \overline{k}_j \cup G_{j-1}^* \text{ where } x \geq 0, \text{ and } \overline{k}_0 = 0$$

Figure 7:
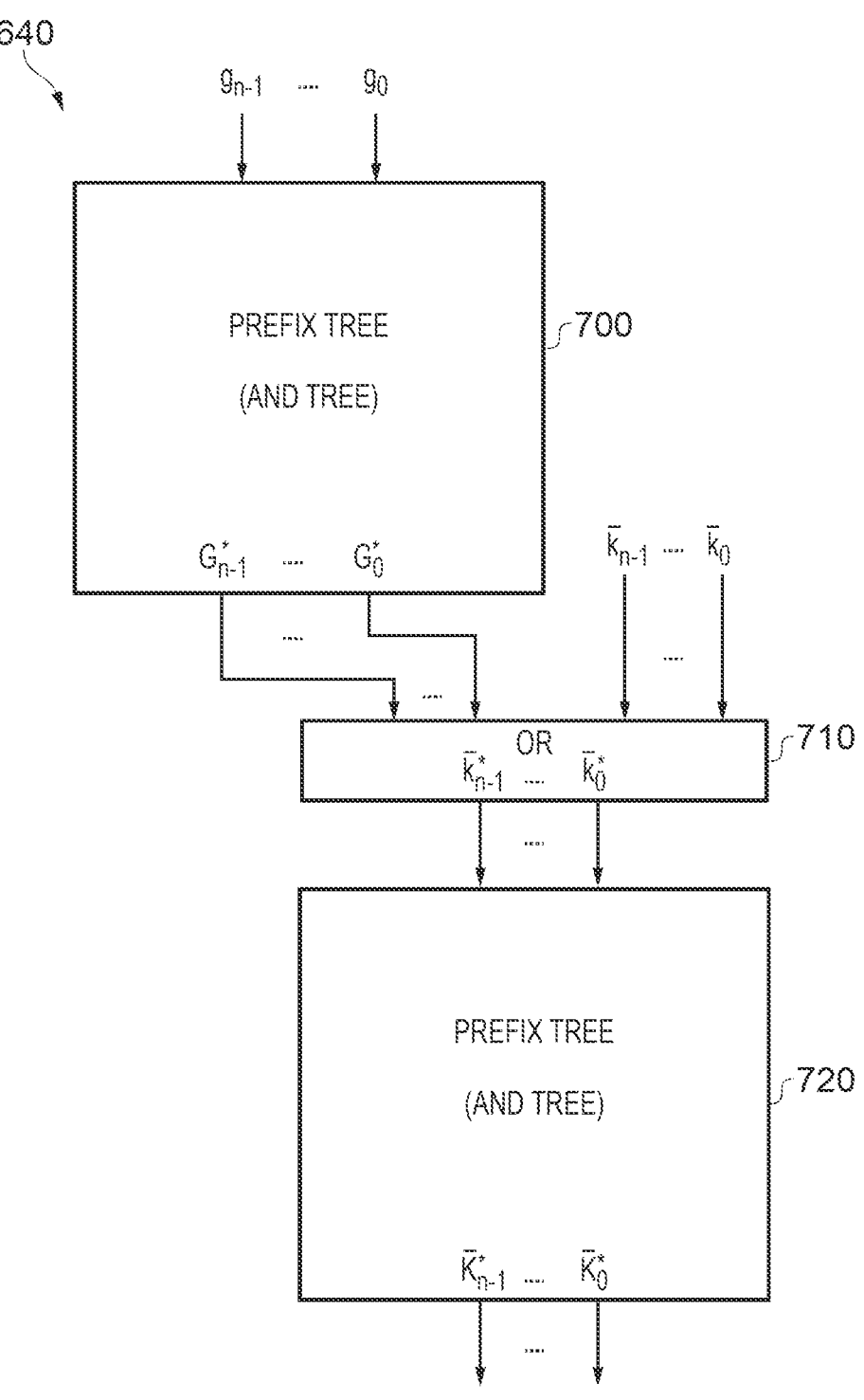
FIG. 7 illustrates an example of prefix trees that can be used with the data processing apparatus of FIG. 6.

FIG. 7 illustrates one way in which to calculate the $\overline{K}^*$ using a pair of prefix trees 640. The first prefix tree 700 is an AND gate tree. This takes the $g_i$ bits and produces the $$G_i^*$$

vectors. These are then provided to OR gates, together with the $\overline{k}_j$ bits, in order to produce the $$\overline{k}_i^*$$

bits as discussed above. Finally, the $$\overline{k}_i^*$$

bits are passed into a further prefix tree 720, which is another AND gate tree, and this produces the $\overline{K}^*$ vectors.

This process, however, can be time consuming, since it requires the use of two AND trees. Furthermore, since each tree can be large, it can occupy a large amount of circuit space.

A different approach is to detect the specific pattern in the input operands that causes the difference between $\overline{K}^*$ and $\overline{K}$ to occur and when this pattern is detected, to build $\overline{K}^*$. The pattern in question that causes the difference is:

. . . $k_{1+1}\overline{k}_i$ . . . $\overline{k}_j k_{j-1} g_{j-2}$ . . . $g_0$ where i≥j Phrased in English, starting from the least significant bits, the pairs of input operands, when combined:

Each generate a carry-generate (g) bit of 1 (in other words, both the a and b bits are 1)

The next most significant bits each generate a carry-kill bit (k) of 1

The next most significant bits (from bit position 'j' which as previously explained is the final pair of bits in the chain where both A and B are 1) generate a carry-kill bit (k) of 0

The next most significant bit generates a carry-kill bit (k) of 1

The next most significant bits are irrelevant

Note that where j=1, there are no g bits and so the pattern would be as follows:

. . . $k_{i+1}\overline{k}_i$ . . . $\overline{k}_1 k_0$

When this pattern is detected, R and K will differ from each other. So, for example, the pattern is present in the example:

A=1011 1010 1011 1111
B=0011 0001 0011 1111

Specifically, the pattern here is $k_{10}\overline{k_9 k_8 k_7}k_6 g_5 g_4 g_3 g_2 g_1 g_0$. In other words, bits 0 to 5 of A and B all create a carry generate of 1 (because both A and B are 1 in these bit positions). Bit position 6 is a carry kill because both $A_6$ and $B_6$ are 0. Then at bit positions 7 through 9, the carry kill value is 0 because any incoming carry is output because the A and B bits for these bit positions are not both 0. Finally at bit position 10, the carry kill value is 0. Therefore, $\overline{K}^*$ and $\overline{K}$ will differ.

Note that in this pattern:

$\overline{K}_h$=1∀h≤j−2
$\overline{K}_m$=0∀m>j−2

However:

$$\overline{K}_h^* = 1 \forall h \leq i$$

Using the above information, $\overline{K}^*$ can be built as:

$$\overline{K}_i^* = \overline{K}_i \cup F_i$$

where F is an n-bit vector with $F_m=1$ for $j-1 \leq m \leq i$ when the pattern is detected, and F is an n-bit vector of 0s when the pattern is not detected (in other words, when the pattern is not detected $\overline{K}^*=\overline{K}$). Using the same example above:

A=1011 1010 1011 1111
B=0011 0001 0011 1111
F=0000 0011 1100 0000
$\overline{K}$=0000 0000 0011 1111
$\overline{K}^*$=0000 0011 1111 1111

The F vector therefore contains 1s from the point at which the initial chain of 1s in both A and B stop until the last occasion where either A or B are 1.

Figure 8:
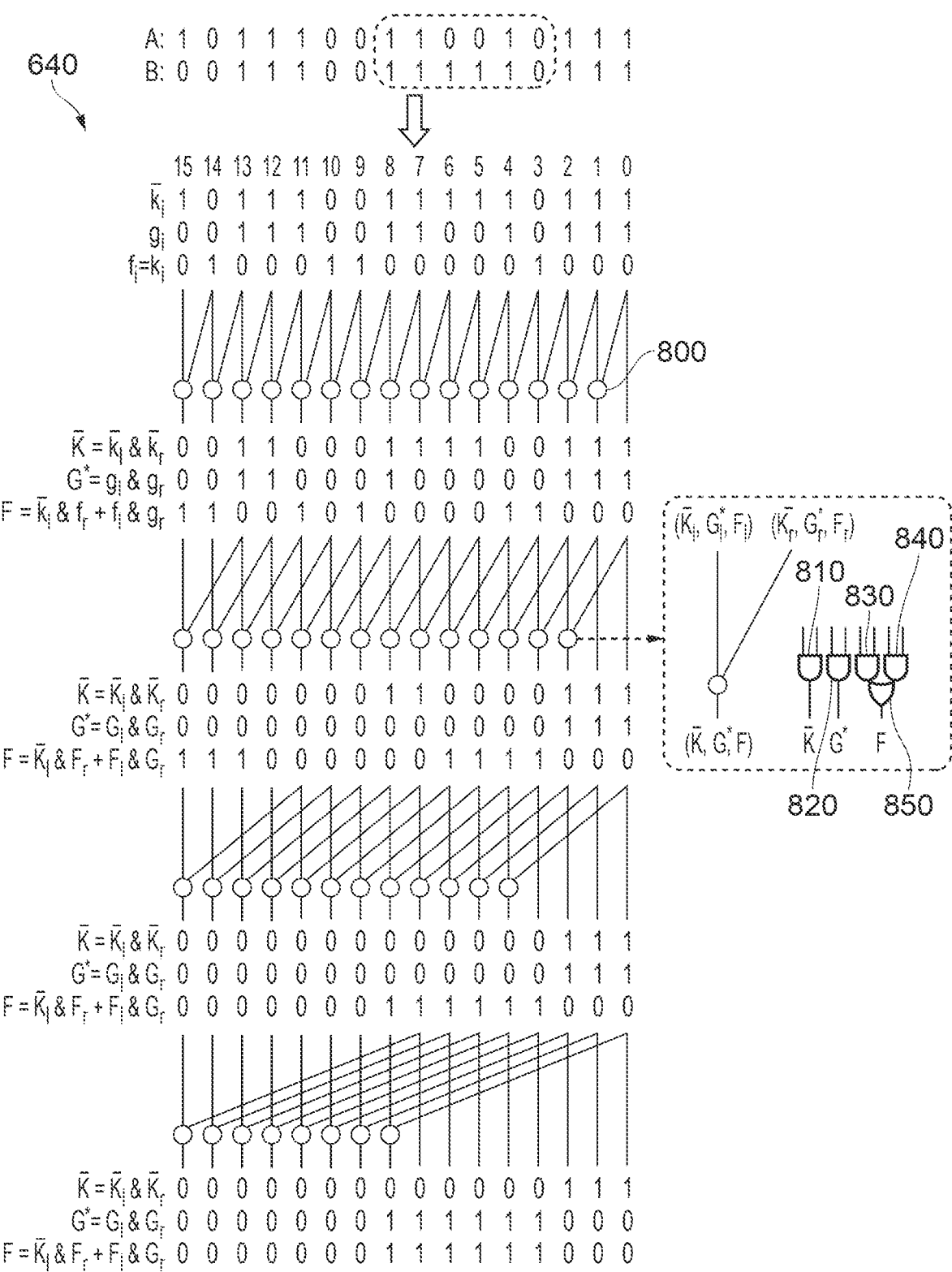
FIG. 8 illustrates an example of prefix trees that can be used with the data processing apparatus of FIG. 6.

FIG. 8 shows a 16-bit example of a single prefix tree 640 that can be used to produce F, G*, and $\overline{K}$ using the inputs $\overline{k}_i$, $g_i$ and $f_i=k_i$. Each node 800 is made up from an AND gate 810 that produces $\overline{K}$ and AND gate 820 that produces G* and a pair of AND gates 830, 840, the outputs of which are provided to an OR gate 850, which produces F. Each 0 in the input is potentially the beginning of the pattern. Each level of the tree may have multiple candidates, however, the last level of the tree has a single candidate for the pattern.

Each pattern candidate is marked with a bit $f_i$ which is 1 only if this pattern candidate is the first pattern in the subset of bits examined so far. Initially, $f_i=k_i$ or $f_i=\overline{g}_i$.

The operation of each node in the tree is:

$$\overline{K} = \overline{K}_l \cap \overline{K}_r$$

$$G^* = \overline{K}_l \cap \overline{K}_r$$

$$F = \overline{K}_l \cap F_r \cup F_r \cap G_r^*$$

The final level produces the vectors $\overline{K}$, G, and F and as previously explained, $\overline{K}^*=\overline{K}_l \cup F_i$ (operation not shown in FIG. 8 for clarity).

Figure 9:
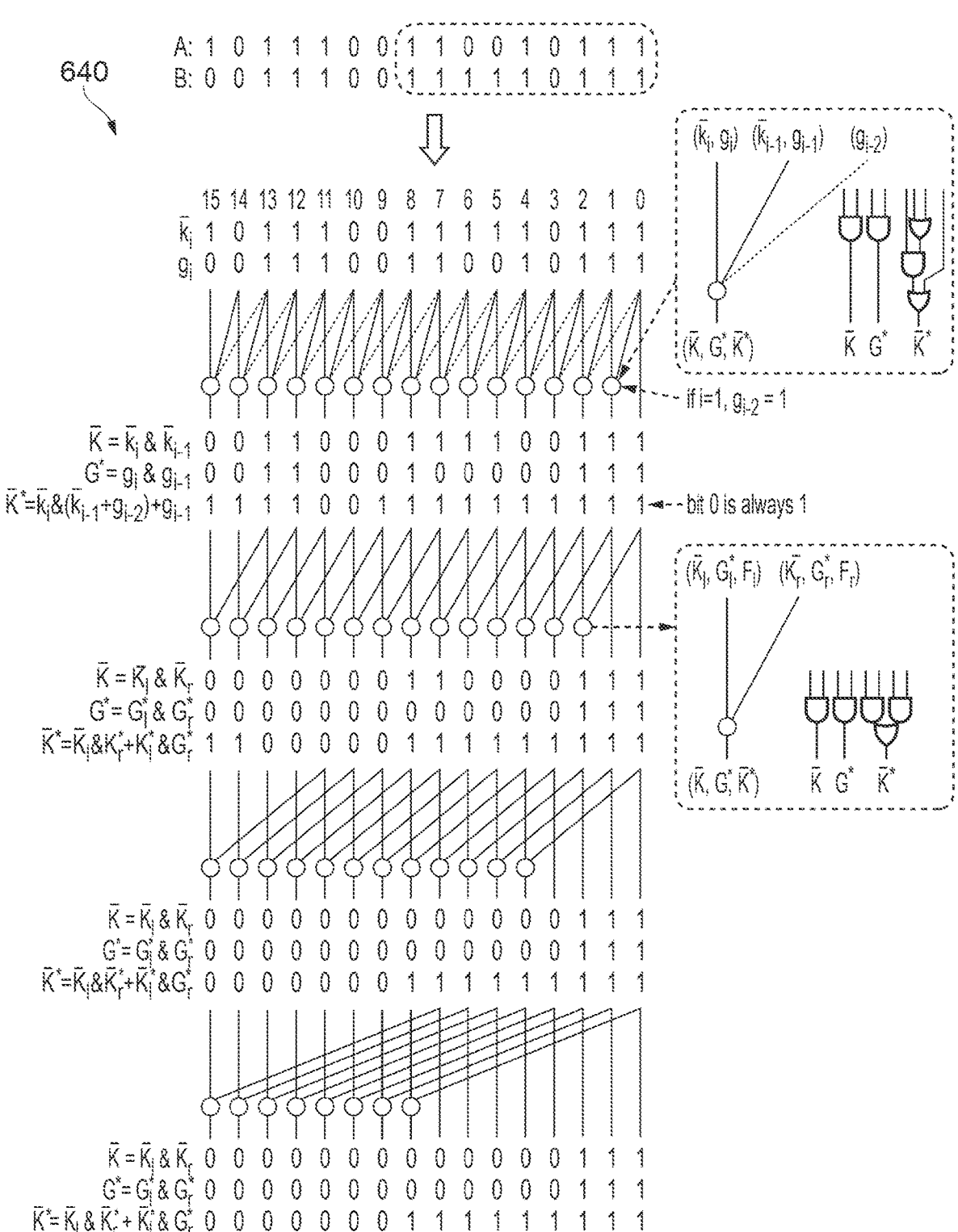
FIG. 9 illustrates an example of prefix trees that can be used with the data processing apparatus of FIG. 6.

It is possible to produce the K vector directly, without having to perform the OR operation between the K and F vectors. The variant is shown in FIG. 9. Here, $$\overline{K} = \overline{K}_l \cap \overline{K}_r$$

$$G^* = \overline{K}_l \cap \overline{K}_r$$

$$\overline{K}^* = \begin{cases} \overline{k}_i \cap (\overline{k_{i-1}} \cup g_{i-2}) \cup g_{i-1} & \text{if level 0} \\ \overline{K}_l \cap \overline{K}_r^* \cup \overline{K}_l^* \cap G_r^* & \text{otherwise} \end{cases}$$

With the exception of the first level (level 0), the vector name simply changes. In the first level, the logical equations are different. The inputs to the nodes at level 0 come from three bit positions: i, i−1 and i−2. For the rightmost node, corresponding to i=1, $g_{i-2}$ is taken as $g_{i-2}=1$. Consequently, the least significant bits of K is set as $\overline{K}^*[0]=1$.

Figure 10:
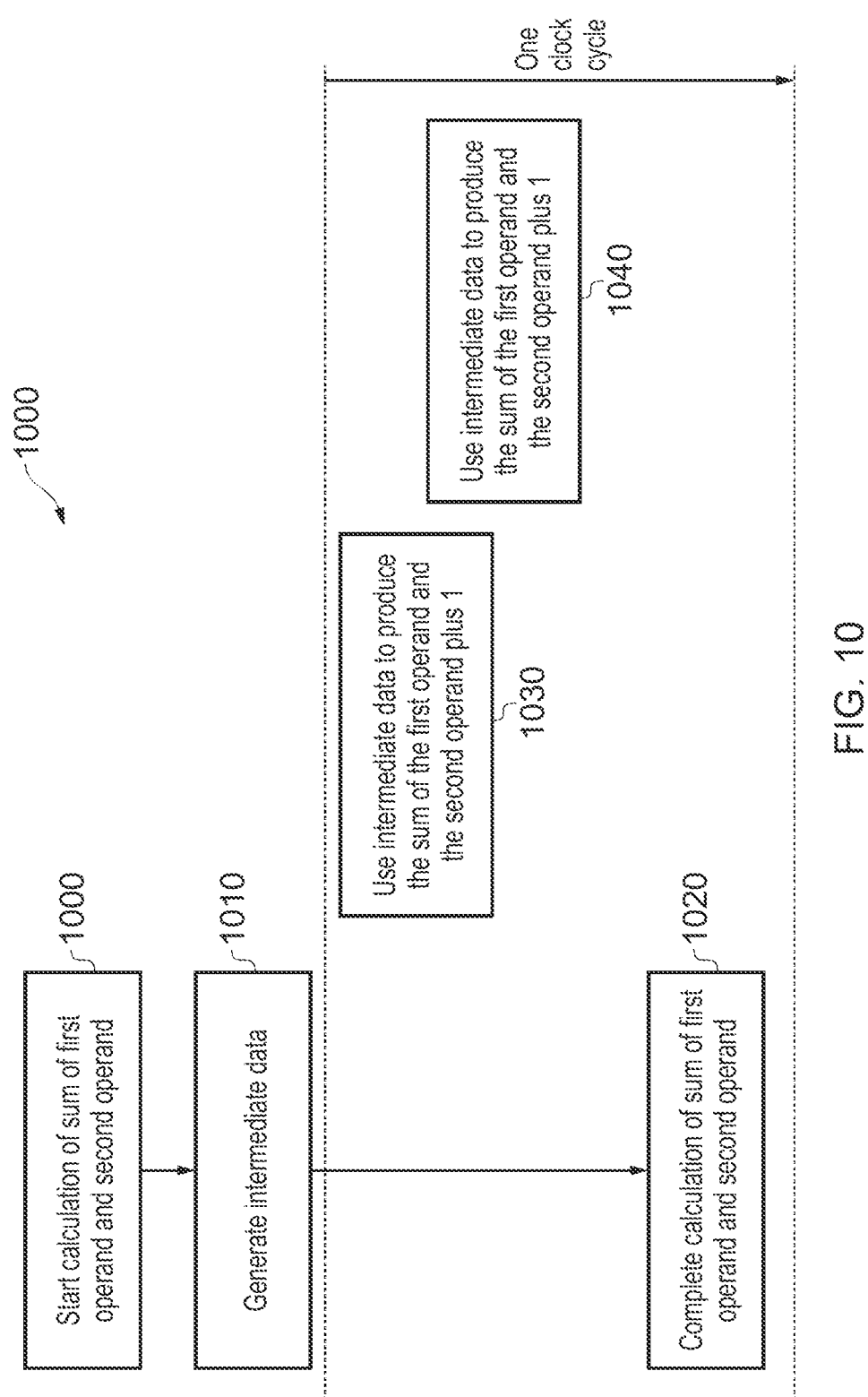
FIG. 10 shows a flow chart that illustrates a data processing operation in accordance with some examples.

FIG. 10 shows a flowchart 1000 in accordance with some embodiments. At a step 1010, a calculation of a product of a first operand and a second operand begins. At a step 1010, intermediate data is generated. At a step 1020, the calculation is completed. After step 1010, the intermediate data is used to produce the sum of the first operand and the second operand plus 1 at a step 1030. Also after step 1010, the intermediate data is used to produce the sum of the first operand and the second operand plus 2 at a step 1040. The time between each of steps 1020, 1030, and 1040 is one clock cycle.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may be define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The present technique could be configured according to the following clauses:

1. A data processing apparatus comprising:
    addition circuitry configured to perform a calculation of a sum of a first operand and a second operand, wherein the addition circuitry produces an intermediate data prior to the calculation completing;
    determination circuitry configured to use the intermediate data to produce the sum of the first operand and the second operand plus 1; and
    further determination circuitry configured to use the intermediate data to produce the sum of the first operand and the second operand plus 2.

2. The data processing apparatus according to clause 1, wherein
    the sum of the first operand and the second operand, the sum of the first operand and the second operand plus 1, and the sum of the first operand and the second operand plus 2, are all produced within a same clock cycle.

3. The data processing apparatus according to any preceding clause, wherein
    the sum of the first operand and the second operand, the sum of the first operand and the second operand plus 1, and the sum of the first operand and the second operand plus 2 are produced using no more than one adder.

4. The data processing apparatus according to any one of clauses 1-3, wherein
    the intermediate data comprises a most significant n−1 bits of the sum of the first operand and the second operand plus 2, wherein n is equal to a number of bits in the sum of the first operand and the second operand.

5. The data processing apparatus according to clause 4, wherein
    the addition circuitry is configured to determine the most significant n−1 bits of the sum of the first operand and the second operand plus 2 without calculating the least significant bit of the sum of the first operand and the second operand plus 2.

6. The data processing apparatus according to any one of clauses 4-5, wherein
    the addition circuitry comprises a dual adder configured to provide a most significant n−1 bits of the sum of the first operand and the second operand and the most significant n−1 bits of the sum of the first operand and the second operand plus 2.

7. The data processing apparatus according to clause 6, wherein
    the addition circuitry is configured to provide the intermediate data to the determination circuitry and the further determination circuitry before a least significant bit of the sum of the first operand and the second operand plus 1 is determined.

8. The data processing apparatus according to any one of clauses 4-7, comprising:
    one or more half adders configured to perform a half-add operation on the first operand and the second operand to produce n bits of an s-value and n bits of a c-value, wherein
    n−1 most significant bits of the s-value and n−1 least significant bits of the c-value are provided to the addition circuitry to provide the most significant n−1 bits of the sum of the first operand and the second operand plus 2.

9. The data processing apparatus according to clause 8, wherein
    the addition circuitry is configured to combine the intermediate data with a least significant bit of the s-value to produce the sum of the first operand and the second operand.

10. The data processing apparatus according to any one of clauses 8-9, wherein
    the further determination circuitry is configured to combine the intermediate data with a least significant bit of the s-value to produce the sum of the first operand and the second operand plus 2.

11. The data processing apparatus according to any one of clauses 8-10, wherein
    the determination circuitry is configured to combine the intermediate data with an inversion of the least significant bit of the s-value to produce the sum of the first operand and the second operand plus 1.

12. The data processing apparatus according to any one of clauses 1-3, wherein
    the addition circuitry comprises determination circuitry to determine, for each pair of (first operand, second operand) bits:
        a generate bit to indicate whether every preceding pair of (first operand, second operand) bits generates an outgoing carry, and
        a propagate bit to indicate whether that pair of (first operand, second operand) bits propagates an incoming carry; and
    the intermediate data comprises the generate bit for the each pair of (first operand, second operand) bits.

13. The data processing apparatus according to clause 12, wherein
    the addition circuitry is configured to calculate a consume bit to indicate whether any preceding pair of (first operand, second operand) bits consumes the incoming carry; and
    the further determination circuitry is configured to calculate a further consume bit to indicate whether any preceding pair of (first operand, second operand) bits consumes the incoming carry or a further incoming carry.

14. The data processing apparatus according to clause 13, wherein
    the further determination circuitry is configured to calculate the further consume bit using a further generate bit to indicate whether every preceding pair of (first operand, second operand) bits generates an outgoing carry and whether a current pair of (first operand, second operand) bits does not generate an outgoing carry.

15. The data processing apparatus according to clause 14, wherein the further determination circuitry is configured to calculate the further consume bit using a first prefix tree and to calculate the further generate bit using a second prefix tree, different to the first prefix tree.

16. The data processing apparatus according to clause 14, wherein the further determination circuitry is configured to calculate the further consume bit and to calculate the further generate bit using a single prefix tree.

17. The data processing apparatus according to any preceding claim, wherein the addition circuitry comprises a dual adder.

18. A method of data processing comprising:

performing a calculation of a sum of a first operand and a second operand, wherein the addition circuitry produces an intermediate data prior to the calculation completing;

using the intermediate data to produce the sum of the first operand and the second operand plus 1; and using the intermediate data to produce the sum of the first operand and the second operand plus 2, wherein each of the sum of a first operand and a second operand, the sum of the first operand and the second operand plus 1, and the sum of the first operand and the second operand plus 2 is produced within a same clock cycle.

19. A non-transitory computer-readable medium to store computer-readable code for fabrication of a data processing apparatus comprising:

addition circuitry configured to perform a calculation of a sum of a first operand and a second operand, wherein the addition circuitry produces an intermediate data prior to the calculation completing;

determination circuitry configured to use the intermediate data to produce the sum of the first operand and the second operand plus 1; and further determination circuitry configured to use the intermediate data to produce the sum of the first operand and the second operand plus 2.

We claim:

1. A data processing apparatus comprising:

addition circuitry configured to perform a calculation of a sum of a first operand and a second operand, wherein the addition circuitry produces an intermediate data prior to the calculation completing;

determination circuitry configured to use the intermediate data to produce the sum of the first operand and the second operand plus 1; and further determination circuitry configured to use the intermediate data to produce the sum of the first operand and the second operand plus 2 the sum of the first operand and the second operand, the sum of the first operand and the second operand plus 1, and the sum of the first operand and the second operand plus 2 are produced using no more than one adder, for a same input.

2. The data processing apparatus according to claim 1, wherein the sum of the first operand and the second operand, the sum of the first operand and the second operand plus 1, and the sum of the first operand and the second operand plus 2, are all produced within a same clock cycle.

3. The data processing apparatus according to claim 1, wherein the intermediate data comprises a most significant n−1 bits of the sum of the first operand and the second operand plus 2, wherein n is equal to a number of bits in the sum of the first operand and the second operand.

4. The data processing apparatus according to claim 3, wherein the addition circuitry is configured to determine the most significant n−1 bits of the sum of the first operand and the second operand plus 2 without calculating the least significant bit of the sum of the first operand and the second operand plus 2.

5. The data processing apparatus according to claim 3, wherein the addition circuitry comprises a dual adder configured to provide a most significant n−1 bits of the sum of the first operand and the second operand and the most significant n−1 bits of the sum of the first operand and the second operand plus 2.

6. The data processing apparatus according to claim 5, wherein the addition circuitry is configured to provide the intermediate data to the determination circuitry and the further determination circuitry before a least significant bit of the sum of the first operand and the second operand plus 1 is determined.

7. The data processing apparatus according to claim 3, comprising:

one or more half adders configured to perform a half-add operation on the first operand and the second operand to produce n bits of an s-value and n bits of a c-value, wherein n−1 most significant bits of the s-value and n−1 least significant bits of the c-value are provided to the addition circuitry to provide the most significant n−1 bits of the sum of the first operand and the second operand plus 2.

8. The data processing apparatus according to claim 7, wherein the addition circuitry is configured to combine the intermediate data with a least significant bit of the s-value to produce the sum of the first operand and the second operand.

9. The data processing apparatus according to claim 7, wherein the further determination circuitry is configured to combine the intermediate data with a least significant bit of the s-value to produce the sum of the first operand and the second operand plus 2.

10. The data processing apparatus according to claim 7, wherein the determination circuitry is configured to combine the intermediate data with an inversion of the least significant bit of the s-value to produce the sum of the first operand and the second operand plus 1.

11. The data processing apparatus according to claim 1, wherein the addition circuitry comprises determination circuitry to determine, for each pair of (first operand, second operand) bits:

a generate bit to indicate whether every preceding pair of (first operand, second operand) bits generates an outgoing carry, and a propagate bit to indicate whether that pair of (first operand, second operand) bits propagates an incoming carry; and the intermediate data comprises the generate bit for the each pair of (first operand, second operand) bits.

12. The data processing apparatus according to claim 11, wherein the addition circuitry is configured to calculate a consume bit to indicate whether any preceding pair of (first operand, second operand) bits consumes the incoming carry; and the further determination circuitry is configured to calculate a further consume bit to indicate whether any preceding pair of (first operand, second operand) bits consumes the incoming carry or a further incoming carry.

13. The data processing apparatus according to claim 12, wherein the further determination circuitry is configured to calculate the further consume bit using a further generate bit to indicate whether every preceding pair of (first operand, second operand) bits generates an outgoing carry and whether a current pair of (first operand, second operand) bits does not generate an outgoing carry.

14. The data processing apparatus according to claim 13, wherein the further determination circuitry is configured to calculate the further consume bit using a first prefix tree and to calculate the further generate bit using a second prefix tree, different to the first prefix tree.

15. The data processing apparatus according to claim 13, wherein the further determination circuitry is configured to calculate the further consume bit and to calculate the further generate bit using a single prefix tree.

16. The data processing apparatus according to claim 1, wherein the addition circuitry comprises a dual adder.

17. A method of data processing comprising:

performing a calculation of a sum of a first operand and a second operand, wherein the addition circuitry produces an intermediate data prior to the calculation completing;

using the intermediate data to produce the sum of the first operand and the second operand plus 1; and using the intermediate data to produce the sum of the first operand and the second operand plus 2, wherein the sum of the first operand and the second operand, the sum of the first operand and the second operand plus 1, and the sum of the first operand and the second operand plus 2 are produced using no more than one adder, for a same input.

18. A non-transitory computer-readable medium to store computer-readable code for fabrication of a data processing apparatus comprising:

addition circuitry configured to perform a calculation of a sum of a first operand and a second operand, wherein the addition circuitry produces an intermediate data prior to the calculation completing;

determination circuitry configured to use the intermediate data to produce the sum of the first operand and the second operand plus 1; and further determination circuitry configured to use the intermediate data to produce the sum of the first operand and the second operand plus 2, the sum of the first operand and the second operand, the sum of the first operand and the second operand plus 1, and the sum of the first operand and the second operand plus 2 are produced using no more than one adder, for a same input.

* * * * *